Patented Jan. 14, 1930

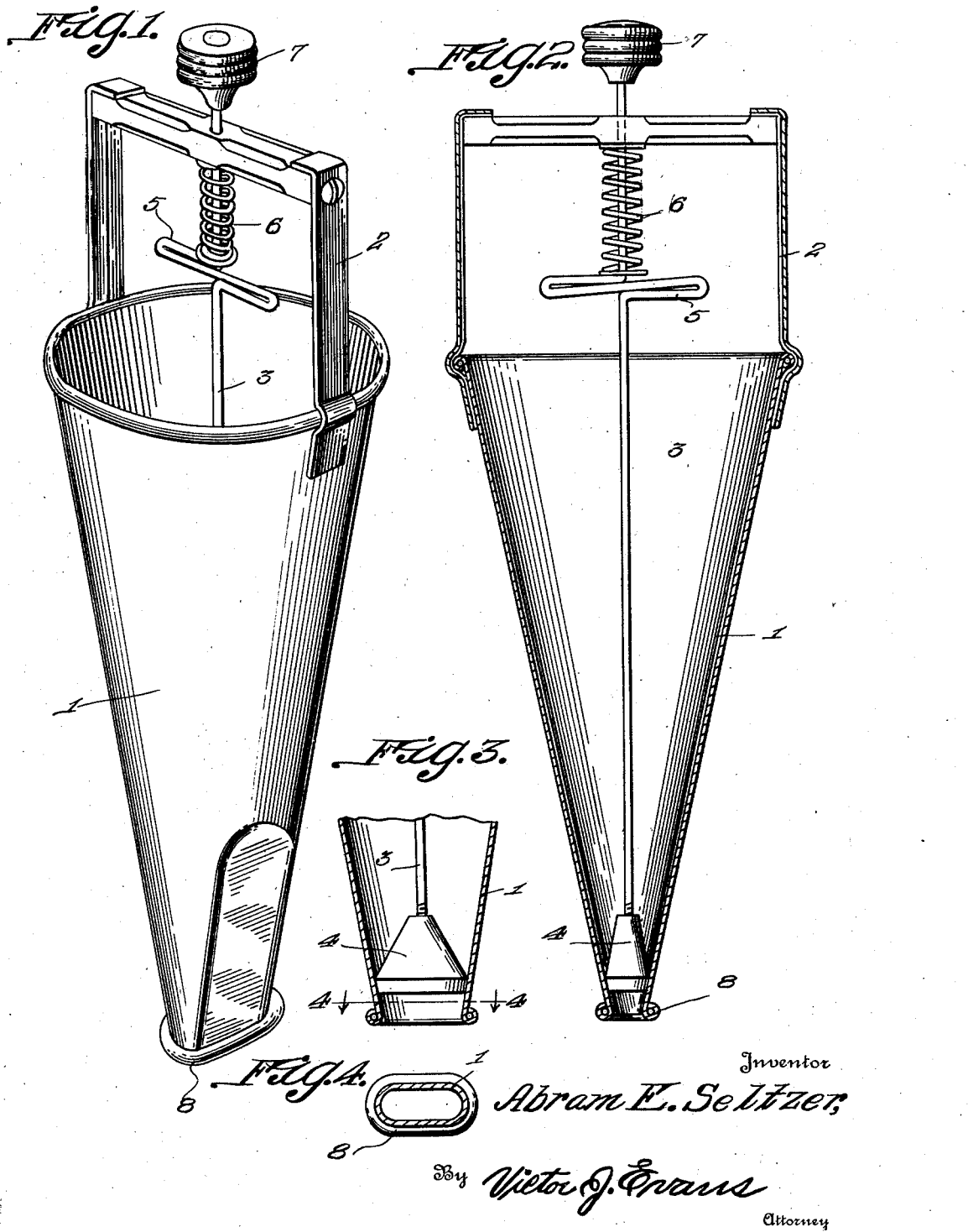

1,743,983

UNITED STATES PATENT OFFICE

ABRAM E. SELTZER, OF HIALEAH, FLORIDA

FERTILIZER DISTRIBUTOR

Application filed July 11, 1928. Serial No. 291,787.

This invention relates to a fertilizer distributor, the general object of the invention being to provide a hand operated device, the holder of which is so formed that a narrow strip of fertilizer can be placed on the ground as the person holding the device walks along, the hand operated valve being so formed that it not only acts to control the flow of fertilizer from the device, but it also acts to agitate the fertilizer in the device and can be used to break up lumps.

This invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:—

Figure 1 is a perspective view of the device.

Figure 2 is a longitudinal sectional view.

Figure 3 is a sectional view through the lower end of the device, the section being taken at right angles to that shown in Figure 2.

Figure 4 is a section on line 4—4 of Figure 3.

In these views, the numeral 1 indicates the body of the device which is of substantially conical shape with its large end uppermost. A yoke-shaped handle 2 is fastened to said upper end and the stem 3 of a valve 4 passes through a hole in the cross piece of the handle. The stem is formed with a double loop 5 adjacent its upper end and a coil spring 6 surrounds the stem and bears against the loop part in the cross piece of the handle. This spring acts to hold the valve 4 in closed position.

The outlet end of the body is of substantially oblong shape, as shown in Figure 4, and the lower end of the valve conforms to this shape of the body so that the valve will tightly close the outlet end of the body and thus prevent escape of material from the body. The valve tapers upwardly and inwardly from its closing end and acts as an agitator for the material when the valve is moved up and down. A knob 7 is fastened to the upper end of the stem so that the valve can be used for breaking up lumps by pressing upon the knob, it being understood that the valve is raised by placing some of the fingers of the hand grasping the cross bar of the handle under one or both loops 5. The lower end of the device is rolled, as shown at 8, to strengthen this part of the body and this rolled end also forms a seat for holding the device in upright position when placed upn a flat surface.

From the foregoing it will be seen that with this device a person can distribute fertilizer as he walks along and can control the flow of fertilizer from the device by manipulating the valve stem through means of the loops 5.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

A device of the class described comprising a downwardly tapering body having an outlet at its lower end, a handle connected with its upper end, a valve controlling the outlet, a stem connected with the valve and passing through the handle, a finger engaging part formed on the stem, a spring on the stem between the finger engaging part and the handle, a knob on the upper end of the stem, said outlet being of oblong shape and the valve tapering upwardly and inwardly from its lower end to form an agitator, with the lower end of the body rolled to form a rest for the device when placed on a flat surface.

In testimony whereof I affix my signature.

ABRAM E. SELTZER.